United States Patent
Wang

(10) Patent No.: US 10,252,436 B2
(45) Date of Patent: Apr. 9, 2019

(54) CUTTING KNIFE ASSEMBLY

(71) Applicant: TECO IMAGE SYSTEMS CO., LTD., Taipei (TW)

(72) Inventor: Hsing-Shu Wang, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 200 days.

(21) Appl. No.: 15/255,574

(22) Filed: Sep. 2, 2016

(65) Prior Publication Data
US 2018/0015624 A1    Jan. 18, 2018

(30) Foreign Application Priority Data

Jul. 18, 2016 (TW) .............................. 105122658 A

(51) Int. Cl.
*B26D 5/00* (2006.01)
*B26D 7/26* (2006.01)
*G05B 19/042* (2006.01)

(52) U.S. Cl.
CPC ........... *B26D 5/005* (2013.01); *B26D 7/2628* (2013.01); *G05B 19/042* (2013.01); *B26D 2005/002* (2013.01); *G05B 2219/25112* (2013.01)

(58) Field of Classification Search
CPC .............................. B23C 3/126; B23C 3/055
USPC ..................... 144/136.95; 408/83.5
See application file for complete search history.

(56) References Cited

U.S. PATENT DOCUMENTS 4,988,245 A * 1/1991 Fukuda .................. B23C 3/126
                                                    144/136.95
5,829,928 A * 11/1998 Harmand ................ B23C 3/055
                                                    408/83.5

FOREIGN PATENT DOCUMENTS

| CN | 101437656 B | 2/2013 |
| CN | 104552465 A | 4/2015 |
| CN | 104827511 A | 8/2015 |
| EP | 2990146 A1 | 3/2016 |
| JP | 2013119146 A | 6/2013 |
| KR | 20090130444 A | 12/2009 |
| TW | 201611975 A | 4/2016 |

* cited by examiner

*Primary Examiner* — Eric C Wai
(74) *Attorney, Agent, or Firm* — Kirton McConkie; Evan R. Witt

(57) ABSTRACT

A cutting knife assembly includes a motor, a knife, a fixing base and a position adjustment stand. The motor has a converter, the knife has a blade portion and a body portion connected with the blade portion and the converter. The fixing base has a main body having a penetration channel and a screw structure. The knife and the converter are penetrated through the penetration channel, the blade portion is exposed outside the main body, and the screw structure is disposed around the penetration channel. The position adjustment stand has a through hole having an inner screw structure matched with the screw structure. The main body and the through hole are screwed with each other. When the converter is driven by the motor, the knife and the fixing base are rotated by the converter, thereby adjusting an exposed distance. The height of the knife can be precisely adjusted.

7 Claims, 9 Drawing Sheets

CUTTING KNIFE ASSEMBLY

CROSS-REFERENCE TO RELATED APPLICATION

This application claims priority from Taiwan Patent Application No. TW 105122658, filed on Jul. 18, 2016, the entire contents of which are incorporated herein by reference for all purposes.

FIELD OF THE INVENTION

The present invention relates to a knife, and more particularly to a cutting knife assembly driven by a motor for adjusting the height.

BACKGROUND OF THE INVENTION

In the field of industrial design, a cutting machine and the knife thereof are usually utilized for cutting papers or models. Generally, the height of a conventional cutting knife is manually adjusted for applying to papers having different thicknesses, or models having different heights or thicknesses.

However, the conventional cutting knife still has some drawbacks. First of all, a user has to be familiar with assembling and disassembling of the conventional cutting knife, and the formula and manner of adjusting and calculating. Secondly, if there is an error of assembling, disassembling or adjusting, a problem or an issue will be caused during using the conventional cutting knife. Moreover, a failure may even occur when a practical cutting is processing.

Please refer to FIG. 1 and FIG. 2. FIG. 1 schematically illustrates the structure of a conventional cutting machine and a conventional cutting knife thereof of prior art. FIG. 2 schematically illustrates the detailed structure of the conventional cutting knife shown in FIG. 1. As shown in FIG. 1 and FIG. 2, the conventional cutting machine 1 has a body 10, a conventional cutting knife 11 and a roller 12. The conventional cutting knife 11 is disposed on a fixing base 110, and the roller 12 is used for bringing an item that is going to be cut to move forward or backward. The conventional cutting knife 11 comprises a knife body 111, an adjustment portion 112 and a blade portion 113.

To adjust the height of the conventional cutting knife 11 for meeting the practical demands, a user has to disassemble the conventional cutting knife 11 from the cutting machine 1, calculate the necessary protrusion of the blade portion 113 according to the thickness or the height of the item that is going to be cut, calculate the theoretical count of circles of rotation of the adjustment portion 112 to achieve the necessary protrusion of the blade portion 113, and then rotate the adjustment portion 112 according to the theoretical count of circles. If one or more of the above-mentioned steps is not really completed, a failure may occur during utilization. In addition, although the blade portion 113 can be passively rotated toward any direction, a failure of rotation may sometimes occur due to the passive rotation, thereby causing a cutting problem.

Therefore, there is a need of providing a cutting knife assembly distinct from the prior art in order to solve the above drawbacks.

SUMMARY OF THE INVENTION

Some embodiments of the present invention are to provide a cutting knife assembly in order to overcome at least one of the above-mentioned drawbacks encountered by the prior arts.

The present invention provides a cutting knife assembly. By utilizing a motor to drive a knife for rotating and utilizing a screw structure of a fixing base and an inner screw structure of a position adjustment stand matched and relatively moved with each other with high precision, an automatic and precise adjustment of an exposed distance (i.e. height of the knife) relative from the blade portion to the through hole through of the position adjustment stand is implemented. An operating error caused by the manual operation of a user that is unfamiliar with the steps of operation and the further failure are also avoided.

The present invention also provides a cutting knife assembly. Since a protrusion block of the converter and a recess of the main body of the fixing base are matched with each other and jointly have a phase-delay design, the angle of the blade portion can be rotated toward the direction of the pattern that is going to be cut when the knife is driven by the motor, so that a cutting error or a failure of cutting can be avoided.

In accordance with an aspect of the present invention, there is provided a cutting knife assembly. The cutting knife assembly includes a motor, a knife, a fixing base and a position adjustment stand. The motor has a converter. The knife has a body portion and a blade portion. The body portion is connected with the blade portion and the converter. The fixing base has a main body. The main body has a penetration channel and a screw structure. The knife and the converter are penetrated through the penetration channel. The blade portion is exposed outside the main body. The screw structure is disposed around the penetration channel. The position adjustment stand has a through hole. The through hole has an inner screw structure matched with the screw structure. The main body and the through hole are screwed with each other. When the converter is driven by the motor, the knife and the fixing base are rotated by the converter, thereby adjusting an exposed distance relative from the blade portion to the through hole through the relationship between the screw structure and the inner screw structure.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
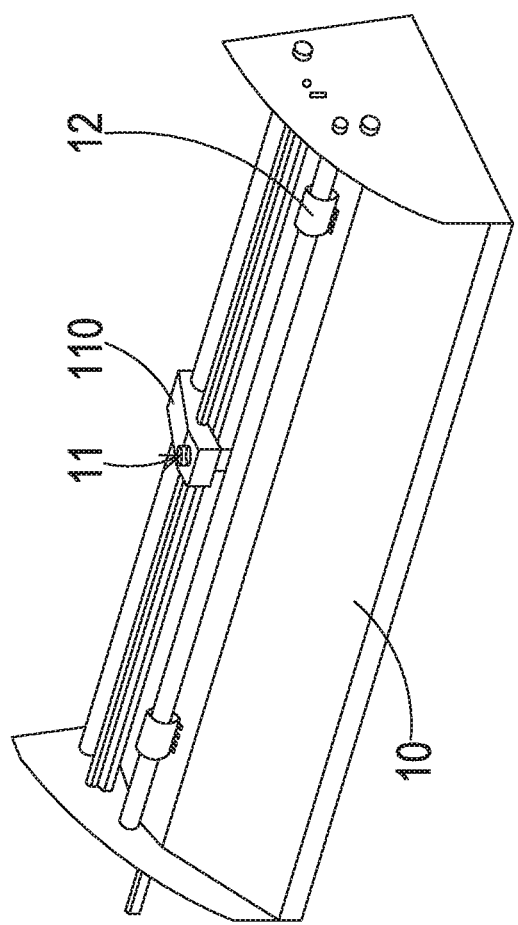
FIG. 1 schematically illustrates the structure of a conventional cutting machine and a conventional cutting knife thereof of prior art.
Figure 2:
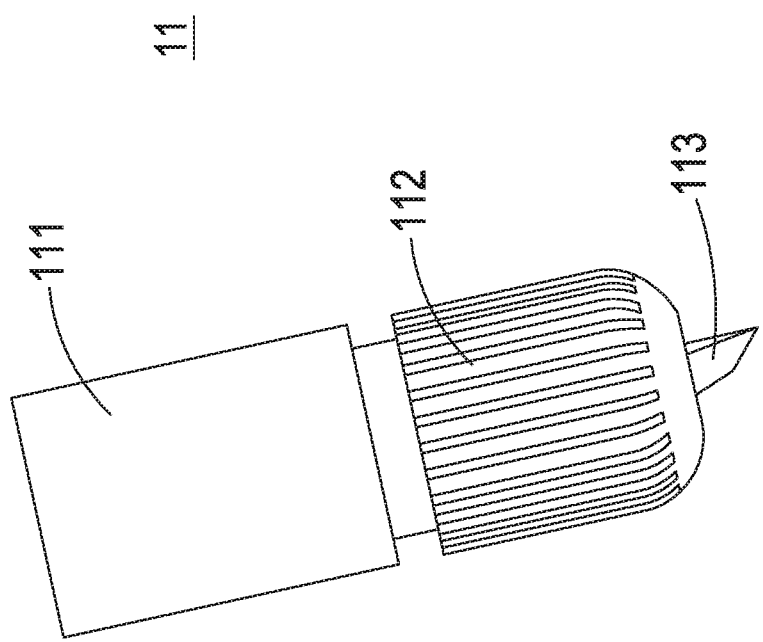
FIG. 2 schematically illustrates the detailed structure of the conventional cutting knife shown in FIG. 1.
Figure 3A:
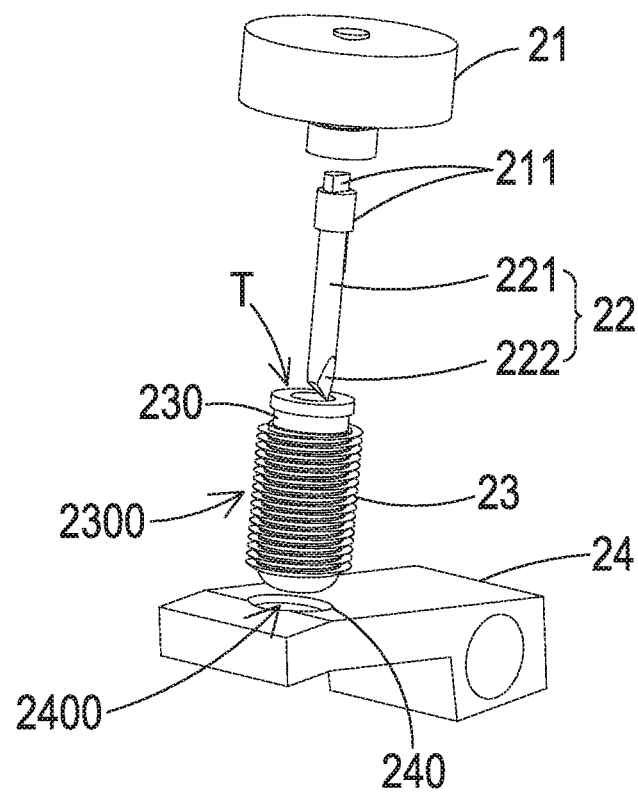
FIG. 3A schematically illustrates the exploded view of a cutting knife assembly according to an embodiment of the present invention.
Figure 3B:
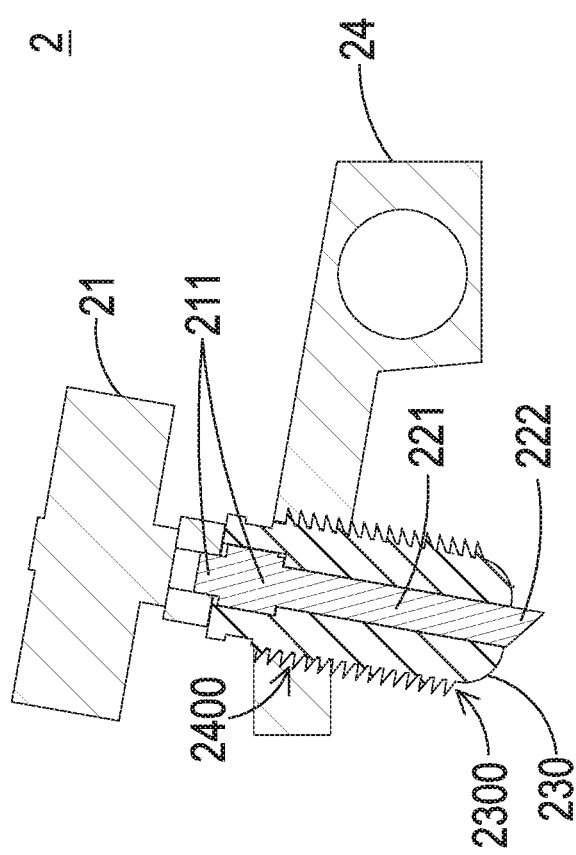
FIG. 3B schematically illustrates a sectional view of the assembled structure of the cutting knife assembly according to an embodiment of the present invention.

Please refer to FIG. 3A and FIG. 3B. FIG. 3A schematically illustrates the exploded view of a cutting knife assembly according to an embodiment of the present invention. FIG. 3B schematically illustrates a sectional view of the assembled structure of the cutting knife assembly according to an embodiment of the present invention. As shown in FIG. 3A and FIG. 3B, a cutting knife assembly 2 of the present invention includes a motor 21, a knife 22, a fixing base 23 and a position adjustment stand 24. The motor 21 has a converter 211. The knife 22 has a body portion 221 and a blade portion 222. The body portion 221 is connected with the blade portion 222 and the converter 211. The fixing base 23 has a main body 230. The main body 230 has a penetration channel T and a screw structure 2300. The knife 22 and the converter 211 are penetrated through the penetration channel T. The blade portion 222 is at least partially exposed outside the main body 230. The screw structure 2300 is disposed around the penetration channel T. The position adjustment stand 24 has a through hole 240. The through hole 240 has an inner screw structure 2400 matched with the screw structure 2300. The main body 230 and the through hole 240 are screwed with each other, so that the fixing base 23 is penetrated through the through hole 240 so as to disposed on the position adjustment stand 24. When the converter 211 is driven by the motor 21, the knife 22 and the fixing base 23 are rotated by the converter 211, thereby adjusting an exposed distance relative from the blade portion 222 to the through hole 240 through the relationship between the screw structure 2300 and the inner screw structure 2400. As a result, an automatic and precise adjustment of an exposed distance (i.e. height of the knife) is implemented. An operating error caused by the manual operation of a user that is unfamiliar with the steps of operation and the further failure are also avoided.

In some embodiments, the shape of the penetration channel T of the main body 230 of the fixing base 23 is completely matched with the shape of the body portion 221 of the knife 22 and a portion of the converter 211, so that the body portion 221 and the portion of the converter 211 are limited inside the penetration channel T, so that the precision of cutting can be kept through keeping the stability during rotation of the knife 22 driven by the motor 21.

Figure 4:
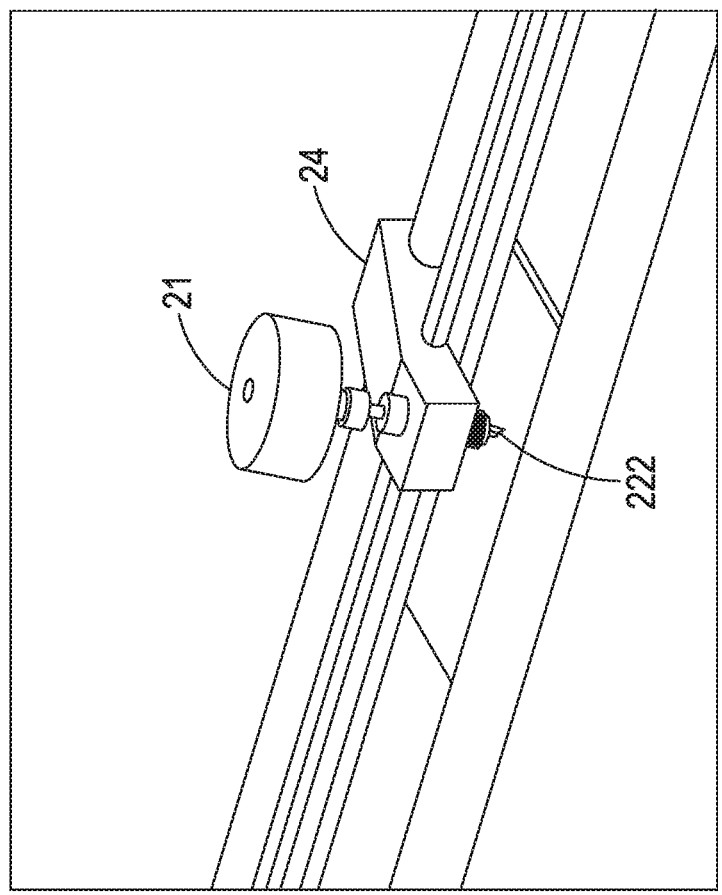
FIG. 4 schematically illustrates an application of a cutting knife assembly of the present invention installed on a cutting equipment.

Please refer to FIG. 3A, FIG. 3B and FIG. 4. FIG. 4 schematically illustrates an application of a cutting knife assembly of the present invention installed on a cutting equipment. As shown in FIG. 3A, FIG. 3B and FIG. 4, the cutting knife assembly 2 is preferred to be installed on a cutting equipment 3 for application, and the height of the knife 22 is driven so as to be adjusted by the motor 21. In some embodiments, the screw structure 2300 of the main body 230 is a clockwise screw structure, and the inner screw structure 2400 of the through hole 240 is a clockwise inner screw structure. When the converter 211 and the knife 22 are driven by the motor 21 to rotate clockwise, the exposed distance of the blade portion 222 of the knife 22 relative to the through hole 240 is increased, and when the converter 211 and the knife 22 are driven by the motor to rotate counterclockwise, the exposed distance is decreased. Certainly, in some embodiments, the screw structure 2300 is a counterclockwise screw structure, and the inner screw structure 2400 is a counterclockwise inner screw structure. When the converter 211 and the knife 22 are driven by the motor 21 to rotate clockwise, the exposed distance is decreased, and when the converter 211 and the knife 22 are driven by the motor 21 to rotate counterclockwise, the exposed distance of the blade portion 222 of the knife 22 relative to the through hole 240 is increased.

Figure 5:
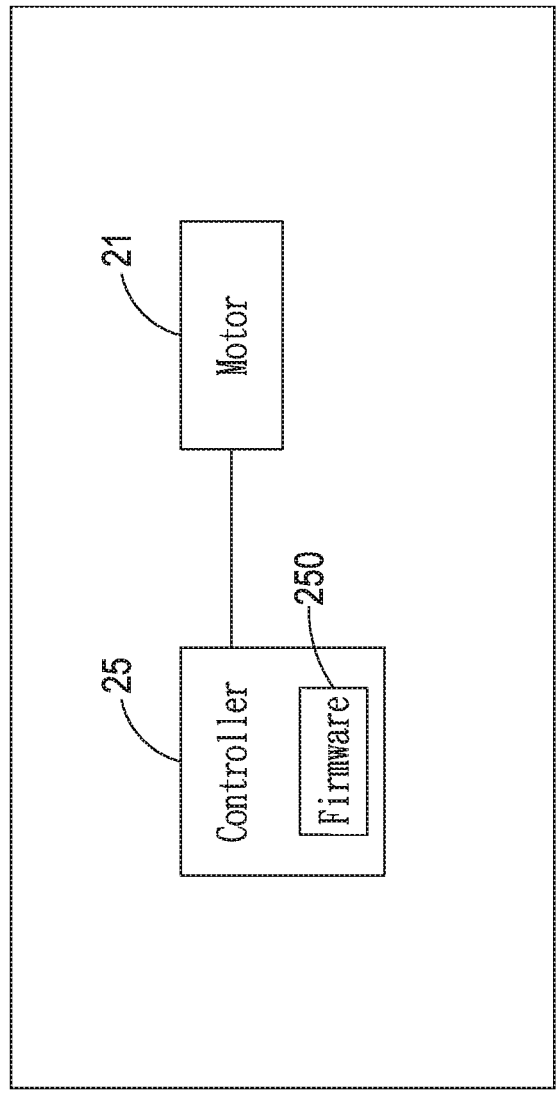
FIG. 5 schematically illustrates the configuration of a motor and a controller and a firmware thereof of a cutting knife assembly of the present invention.

Please refer to FIG. 3A and FIG. 5. FIG. 5 schematically illustrates the configuration of a motor and a controller and a firmware thereof of a cutting knife assembly of the present invention. As shown in FIG. 3A and FIG. 5, the cutting knife assembly 2 further includes a controller 25. The controller 24 includes a firmware 250. The controller 25 is connected with the motor 21 for controlling the motor 21 according to the firmware 250, so that the knife 22 is driven by the motor 21 for cutting. For example, the motor 21 can be correspondingly controlled by the firmware 250 of the controller 25 to drive the knife 22 to rotate according to a cutting pattern, a value of an image file or a value of a vector file for cutting a pattern such like a photo, an image file or a vector file. To adjust with high precision, the motor 21 of the present invention is preferred to be a step motor, but not limited herein.

Figure 6A:
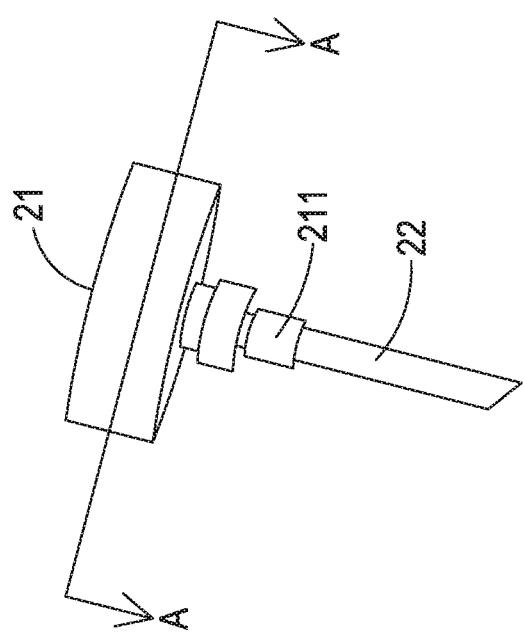
FIG. 6A schematically illustrates the structure of a cutting knife assembly of the present invention after a motor, a converter and a knife are assembled.
Figure 6B:
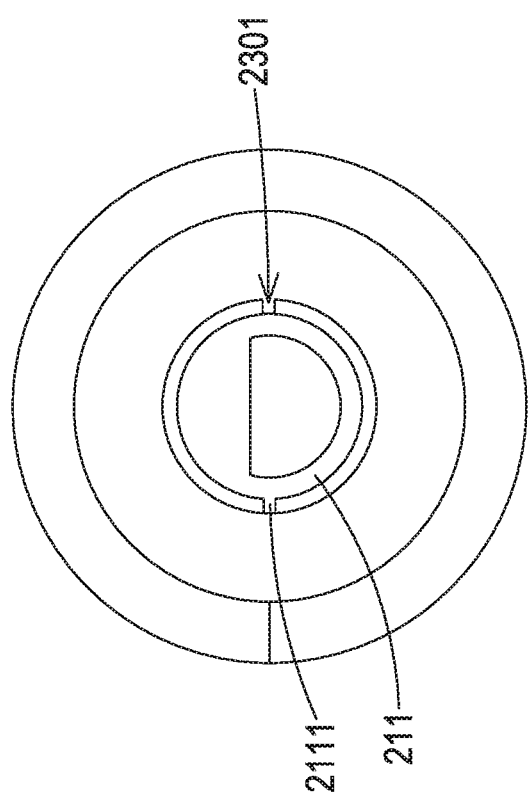
FIG. 6B schematically illustrates the sectional view of the knife located on an initial position along the A-A line shown in FIG. 6A.
Figure 6C:
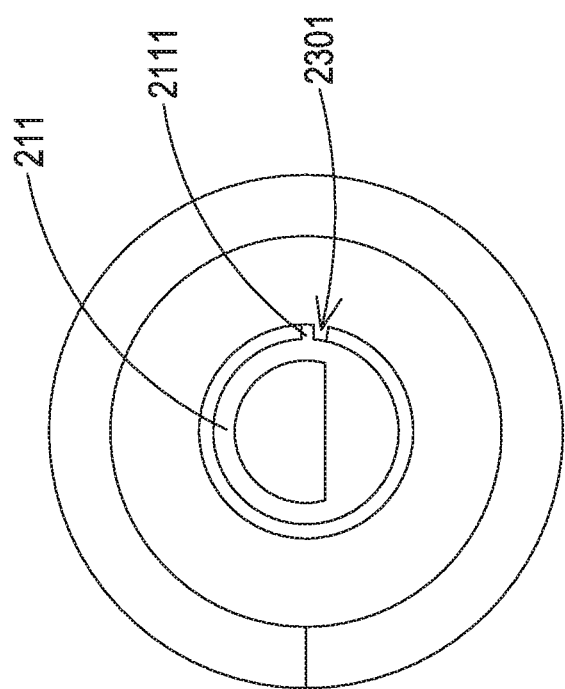
FIG. 6C schematically illustrates the sectional view of the knife driven by the motor and rotated 180 degrees clockwise or counterclockwise along the A-A line shown in FIG. 6A.

Please refer to FIG. 6A, FIG. 6B and FIG. 6C. FIG. 6A schematically illustrates the structure of a cutting knife assembly of the present invention after a motor, a converter and a knife are assembled. FIG. 6B schematically illustrates the sectional view of the knife located on an initial position along the A-A line shown in FIG. 6A. FIG. 6C schematically illustrates the sectional view of the knife driven by the motor and rotated 180 degrees clockwise or counterclockwise along the A-A line shown in FIG. 6A. As shown in FIGS. 6A, 6B and 6C, a phase-delay design is utilized by the cutting knife assembly 2 of the present invention. In particular, the outer circumference of the converter 211 of the motor 21 of the cutting knife assembly 2 of the present invention has a protrusion block 2111, the position where the penetration channel T is corresponded to the converter 211, of the main body 230 of the fixing base 23 has a recess 2301, and the protrusion block 2111 is matched with the recess 2301. When the knife 22 is not driven by the motor 21 to rotate, which means that when the knife 22 is located at an initial position (as shown in FIG. 6B), or when the knife 22 is driven by the motor 21 to rotate an angle less than 180 degrees clockwise or counterclockwise, no matter how the motor 21 drives the knife 22 to rotate for cutting, the protrusion block 2111 will not be engaged with the recess 2301. That is, under the rotation of this range of the rotational angle, the exposed distance of the knife portion 222 of the knife 22 relative to the through hole 240 (i.e. the height of the knife 22) can be effectively kept during cutting.

On the other hand, when the converter 211 is driven by the motor 21 to rotate 180 degrees clockwise or 180 degrees counterclockwise with the knife 22 (as shown in FIG. 6C), the protrusion block 2111 is engaged with the recess 2301 for taking the fixing base 23 and the knife 22 and the converter 211 to be synchronously rotated. In other words, the cutting knife assembly 2 of the present invention has a phase-delay design with ±180 degrees. When the rotational angle is greater than 180 degrees, the rotation of the knife 22 driven by the motor 21 will change the exposed distance of the knife portion 222 of the knife 22 relative to the through hole 240 (i.e. the height of the knife 22).

From the above description, the present invention provides a cutting knife assembly. By utilizing a motor to drive a knife for rotating and utilizing a screw structure of a fixing base and an inner screw structure of a position adjustment stand matched and relatively moved with each other with high precision, an automatic and precise adjustment of an exposed distance (i.e. height of the knife) relative from the blade portion to the through hole through of the position adjustment stand is implemented. An operating error caused by the manual operation of a user that is unfamiliar with the steps of operation and the further failure are also avoided. Meanwhile, since a protrusion block of the converter and a recess of the main body of the fixing base are matched with each other and jointly have a phase-delay design, the angle of the blade portion can be rotated toward the direction of the pattern that is going to be cut when the knife is driven by the motor, so that a cutting error or a failure of cutting can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cutting knife assembly, comprising:
    a motor having a converter;
    a knife having a body portion and a blade portion, wherein the body portion is connected with the blade portion and the converter;
    a fixing base having a main body, wherein the main body has a penetration channel and a screw structure, the knife and the converter are penetrated through the penetration channel, the blade portion is exposed outside the main body, and the screw structure is disposed around the penetration channel, and wherein the shape of the penetration channel is completely matched with the shape of the body portion and a portion of the converter, so that the body portion and the portion of the converter are limited inside the penetration channel; and
    a position adjustment stand having a through hole, wherein the through hole has an inner screw structure matched with the screw structure, and the main body and the through hole are screwed with each other,
    wherein the outer circumference of the converter has a protrusion block, the position where the penetration channel is corresponded to the converter, of the main body has a recess, and the protrusion block is matched with the recess, wherein when the converter is driven by the motor, the knife and the fixing base are rotated by the converter, thereby adjusting an exposed distance relative from the blade portion to the through hole through the relationship between the screw structure and the inner screw structure, and wherein when the converter is driven by the motor to rotate 180 degrees clockwise or 180 degrees counterclockwise with the knife, the protrusion block is engaged with the recess for taking the fixing base and the knife and the converter to be synchronously rotated.

2. The cutting knife assembly according to claim 1, wherein the screw structure is a clockwise screw structure, and the inner screw structure is a clockwise inner screw structure.

3. The cutting knife assembly according to claim 2, wherein when the converter and the knife are driven by the motor to rotate clockwise, the exposed distance is increased, and when the converter and the knife are driven by the motor to rotate counterclockwise, the exposed distance is decreased.

4. The cutting knife assembly according to claim 1, wherein the screw structure is a counterclockwise screw structure, and the inner screw structure is a counterclockwise inner screw structure.

5. The cutting knife assembly according to claim 4, wherein when the converter and the knife are driven by the motor to rotate clockwise, the exposed distance is decreased, and when the converter and the knife are driven by the motor to rotate counterclockwise, the exposed distance is increased.

6. The cutting knife assembly according to claim 1, wherein the motor is a step motor.

7. The cutting knife assembly according to claim 1 further comprising a controller, wherein the controller comprises a firmware, and the controller is connected with the motor for controlling the motor according to the firmware, so that the knife is driven by the motor for cutting.

\* \* \* \* \*